United States Patent [19]

Overington

[11] Patent Number: 5,456,572
[45] Date of Patent: Oct. 10, 1995

[54] NESTING DEVICE

[76] Inventor: John D. Overington, 539 Rouge Hills Road, Scarborough, Ontario, Canada, M1C 2Z9

[21] Appl. No.: 189,480

[22] Filed: Jan. 31, 1994

[51] Int. Cl.[6] .................................................. B65G 47/24
[52] U.S. Cl. ........................ 414/788.2; 198/374; 198/418; 414/798.4
[58] Field of Search .................................. 198/374, 418; 414/788.2, 788.3, 798.4, 757, 774, 778

[56] References Cited

U.S. PATENT DOCUMENTS

| | | |
|---|---|---|
| 2,919,011 | 12/1959 | Tocher ..................................... 198/374 |
| 3,880,070 | 4/1975 | Kaplan . |
| 3,880,296 | 4/1975 | Kaplan . |
| 3,920,132 | 11/1975 | Cleland et al. . |
| 3,957,163 | 5/1976 | Tanzler . |
| 4,109,801 | 8/1978 | Uchida et al. . |
| 4,165,006 | 8/1979 | Brusa . |
| 4,184,800 | 1/1980 | Uchida et al. . |
| 4,278,377 | 7/1981 | Elineau . |
| 4,392,765 | 7/1983 | Barton et al. . |
| 4,419,928 | 12/1983 | Klusmier . |
| 4,427,145 | 1/1984 | Harris ..................................... 414/798.4 |
| 4,487,540 | 12/1984 | Buchheit . |
| 4,566,833 | 1/1986 | Gigante . |

FOREIGN PATENT DOCUMENTS

| | | | |
|---|---|---|---|
| 233109 | 2/1986 | Germany ............................ | 414/788.2 |
| 97972 | 8/1979 | Japan .................................. | 414/788.2 |
| 85729 | 5/1982 | Japan .................................. | 414/788.2 |

*Primary Examiner*—Michael S. Huppert
*Assistant Examiner*—Thomas J. Brahan
*Attorney, Agent, or Firm*—Thomas A. O'Rourke

[57] ABSTRACT

Disclosed herein is a device for nesting articles of the type having a nesting surface with a number of formations thereon, comprising first locating means for locating a first article and second locating means for locating a second article, actuating means for actuating the first and second locating means to cause the articles to nest together at the nesting surfaces, the actuating means including a first mechanism to actuate the first locating means and a second mechanism to actuate the second locating means, the first mechanism being arranged to actuate in advance of the second mechanism, in order to nest the articles with the formations in staggered relationship. A technique is also disclosed for nesting articles.

17 Claims, 9 Drawing Sheets

NESTING DEVICE

BACKGROUND OF THE INVENTION

1. Field of the Invention

The present invention relates to nesting devices.

2. Description of the Related Art

Nesting devices have been used successfully to reduce the amount of manual labour required to fabricate a variety of articles. Channel members are especially labour intensive since one must be nested into another before they can be stacked efficiently. A common type of channel member is a wall stud which in recent years has seen widespread use in the walls of modern buildings. The wall stud fabricating industry is heavily labour intensive and the risk of repetitive strain injury claims is high, in part due to the need to invert, nest and stack the wall studs. There remains a need for an automatic nesting device that will reduce the labour required for handling channel members.

It is therefore an object of the present invention to provide a novel nesting device.

SUMMARY OF THE INVENTION

Briefly stated, the invention involves a device for nesting articles of the type having a nesting surface with a number of formations thereon, comprising:

first locating means for locating a first article and second locating means for locating a second article, actuating means for actuating the first and second locating means to cause the articles to nest together at the nesting surfaces, the actuating means including a first mechanism to actuate the first locating means and a second mechanism to actuate the second locating means, the first mechanism being arranged to actuate in advance of the second mechanism, in order to nest the articles with the formations in staggered relationship.

In another aspect of the present invention, there is provided a technique for nesting articles of the type having a nesting surface with a number of formations thereon;, the technique including the steps of:

providing a first location to receive a first article providing a second location to receive a second article, displacing the first location relative to the second location to bring the articles together at the nesting surfaces, wherein the first location is displaced ahead of the second location to permit the formations on one of the article to be staggered with the formations on the other of the articles.

In still another aspect of the present invention, there is provided a device for assembling articles, comprising:

a bed having a surface with a receiving area to receive articles and an assembly area for assembling the articles, the articles having a leading face and a trailing face;

first transfer means for transferring articles from the receiving area to the assembly area to form an assembled group of the articles;

first pressure means for maintaining pressure on the articles between the receiving area and the assembly area, the pressure means including a first pressure element adjacent the leading face of a leading one of the articles in the assembled group.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Referring to the FIGURES, there is provided a nesting device 10 having a main frame 12 supporting a feed conveyor 14 to feed channel members 15 such as 'wall studs' from an earlier fabricating station, not shown. The channel members are one example of an article having a nesting surface with a number of formations. thereon, in this case the side walls thereof, as will be described. The feed conveyor 14 has a downstream end located adjacent a pusher plate mechanism 16. The main frame 12 also includes a main bed 12a which supports a positioning conveyor 18. The positioning conveyor 18 receives the channel members 15 from the feed conveyor 14 by the action of the pusher plate mechanism 16 and displaces the channel members 15 in a direction perpendicular to the feed conveyor 14 toward an elongate aperture 20 formed in the opposite end of the main bed. The elongate aperture 20 serves as a discharge passage to deliver the channel members 15 to receiving means in the form of a secondary bed 22 as will be described. Located adjacent the elongate aperture 20 is a first proximity switch 24 to detect the presence of first channel member 15 and a second proximity switch 25 to detect the presence of a second channel member. Referring to FIG. 1a, the proximity switch 25 projects though a hole in the main bed 12a and activated by a passing channel member.

The pusher plate mechanism 16 includes a pusher plate 16a which is displaced across the feed conveyor 14 by way of a pair of bell cranks 16b each of which is pivoted to a portion 12b of the main frame 12. A gear 16c is fixed to each bell crank 16b and is driven by a toothed belt 16d, itself driven by an actuator 16e.

Figure 1:
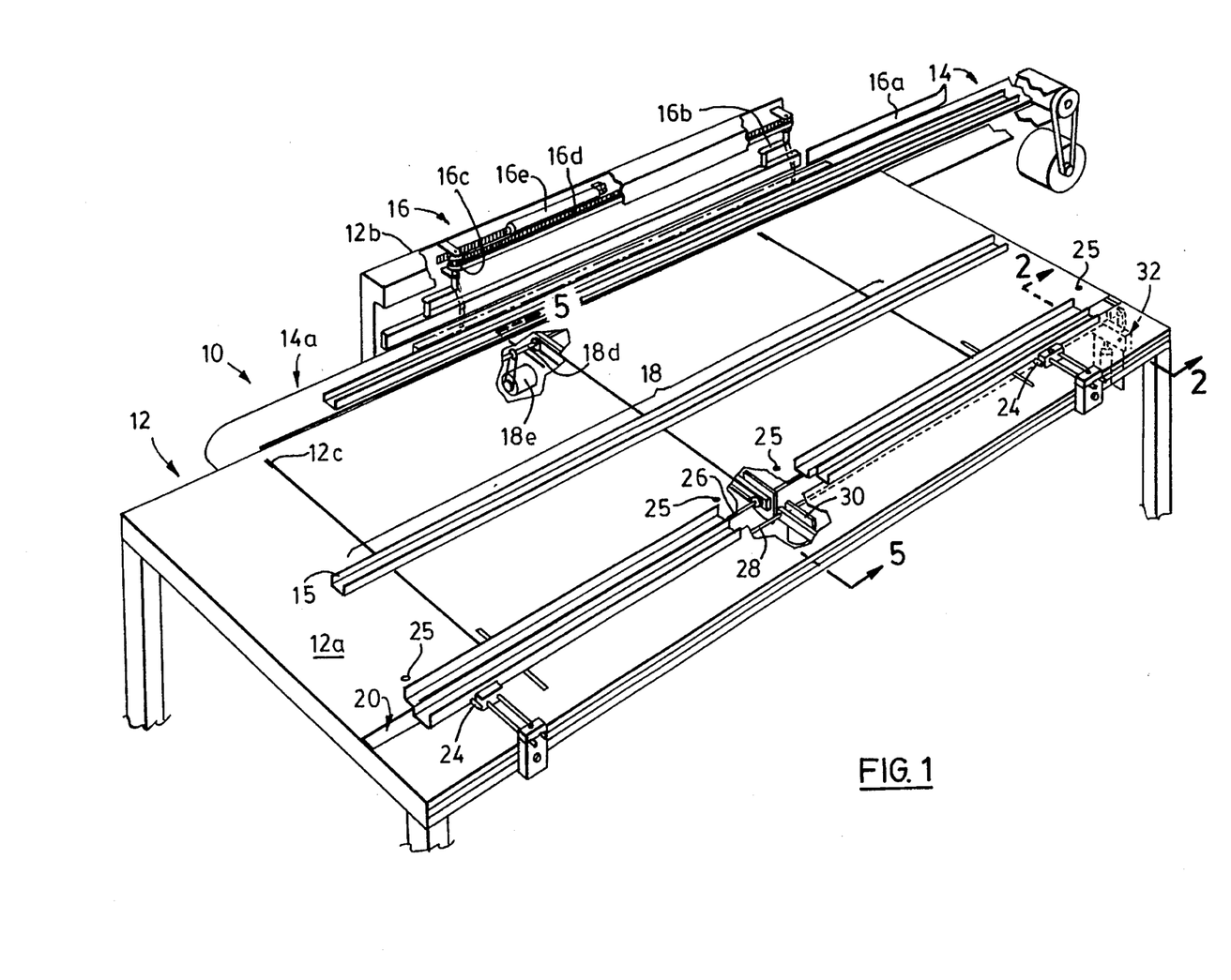
FIG. 1 is a fragmentary perspective view of a portion of a nesting device.
Figures 1A, 3:
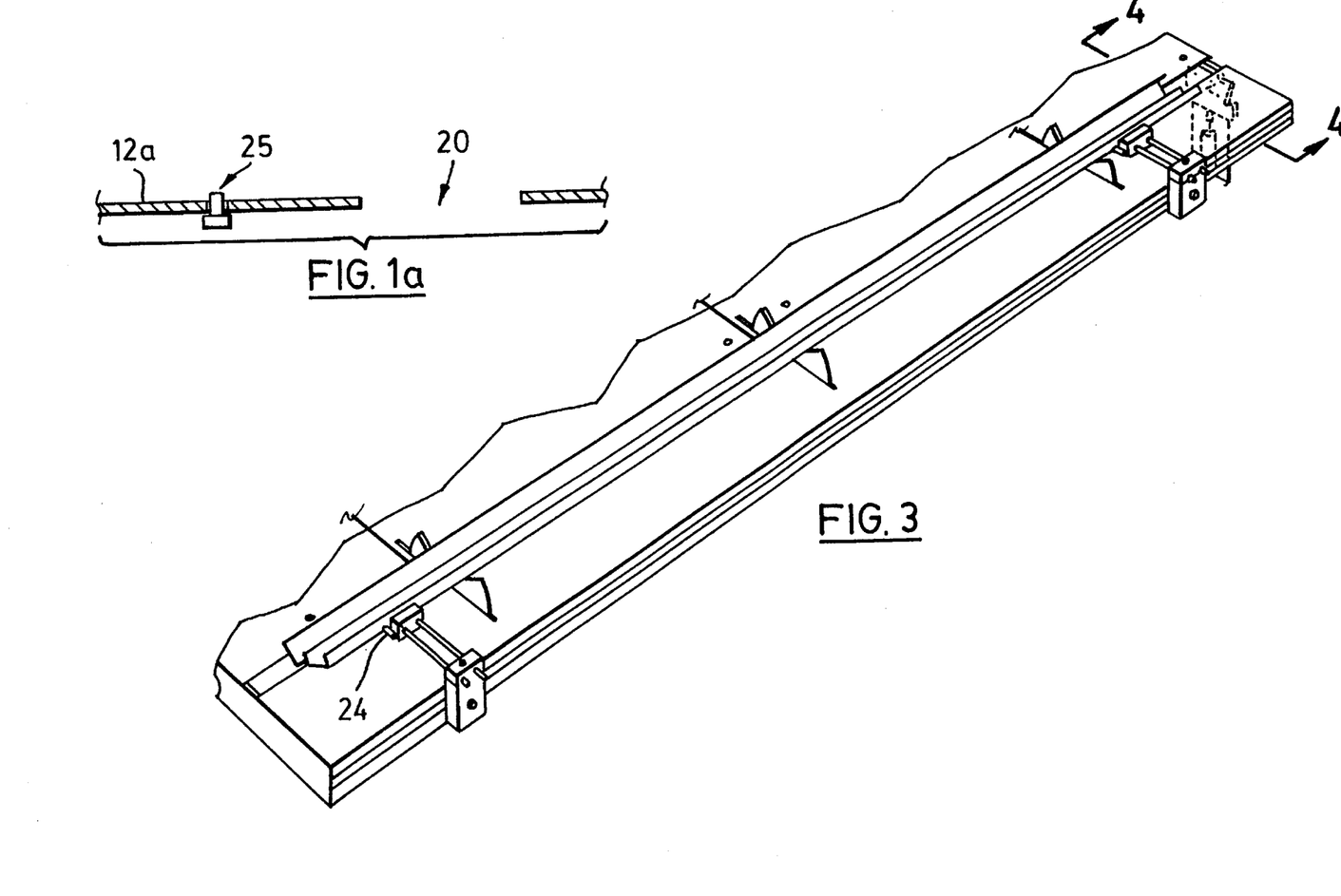
FIG. 1a is a sectional view of another portion of a nesting device.
FIG. 3 is another fragmentary perspective view of a portion of the nesting device of FIG. 1.
Figure 5:
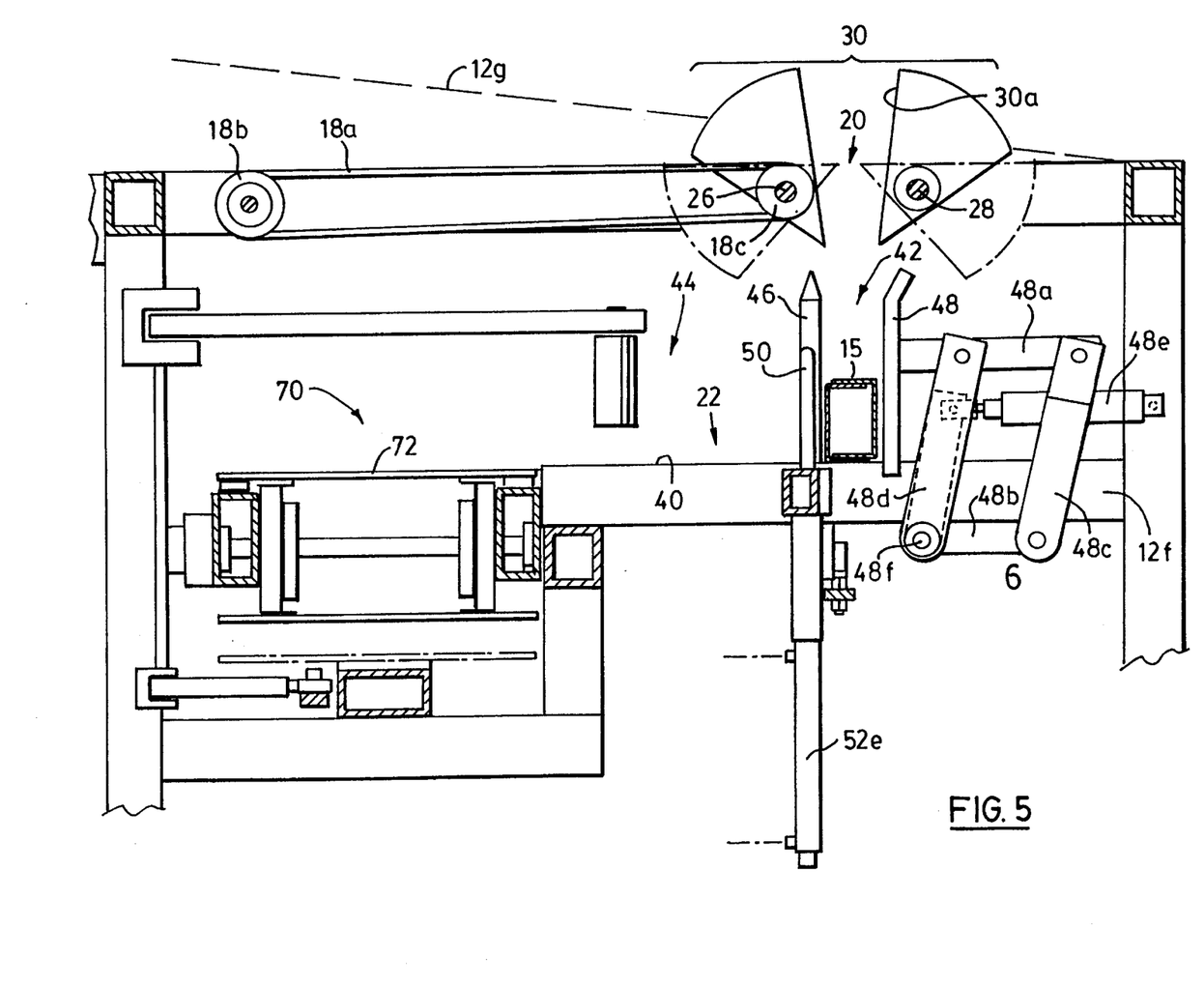
FIG. 5 is a fragmentary sectional view taken on line 5—5 of FIG. 1.

Referring to FIGS. 1 and 5, the positioning conveyor 18 is made up of three continuous cord members 18a each held between two pulleys 18b, 18c and emerging through a pair of narrow apertures 12c at the upstream end of the main bed 12a and the elongate aperture 20 at the downstream end of the main bed. Each of the pulleys at the upstream end is fixed to a shaft 18d. The shaft 18d is driven by a gear and chain arrangement which is driven by an electric motor as shown at 18e.

The pulleys at the downstream end of the main bed 12a are free to spin on shaft 26. It will be seen that another shaft 28 is located adjacent the elongate aperture 20 and parallel to the shaft 26.

Figure 4:
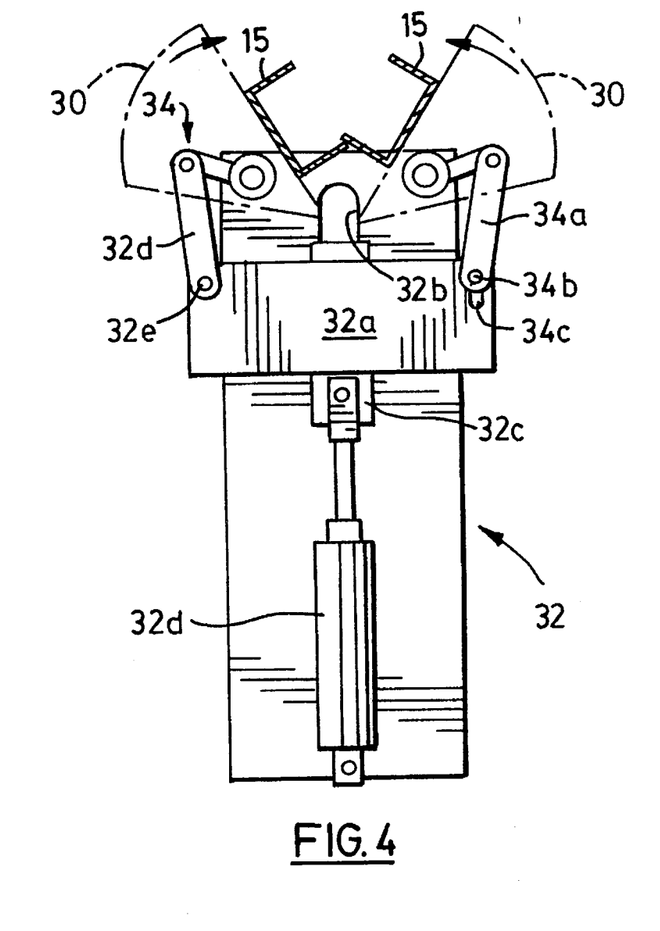
FIG. 4 is a sectional view taken on line 4—4 of FIG. 3.

A particular feature of the present invention is the use of a first locating means for locating a first article and second locating means for locating a second article. This is exemplified by the use of three pairs of paddles 30 which are attached to the shafts 26 and 28. Each of the paddles 30 has a surface 30a parallel with the main bed 12a when in a ready position and movable from the article-receiving ready position in a convergent upward direction as shown by the arrows in FIG. 4 toward a generally upright article-nesting position. Rather than being freely attached to the shaft as the pulleys, the paddles 30 are fixedly attached thereto and an actuating mechanism 32, shown in FIGS. 2 and 4, is provided to rotate the two shafts 26, 28 to cause the convergent upward motion of the paddles 30.

Figure 2:
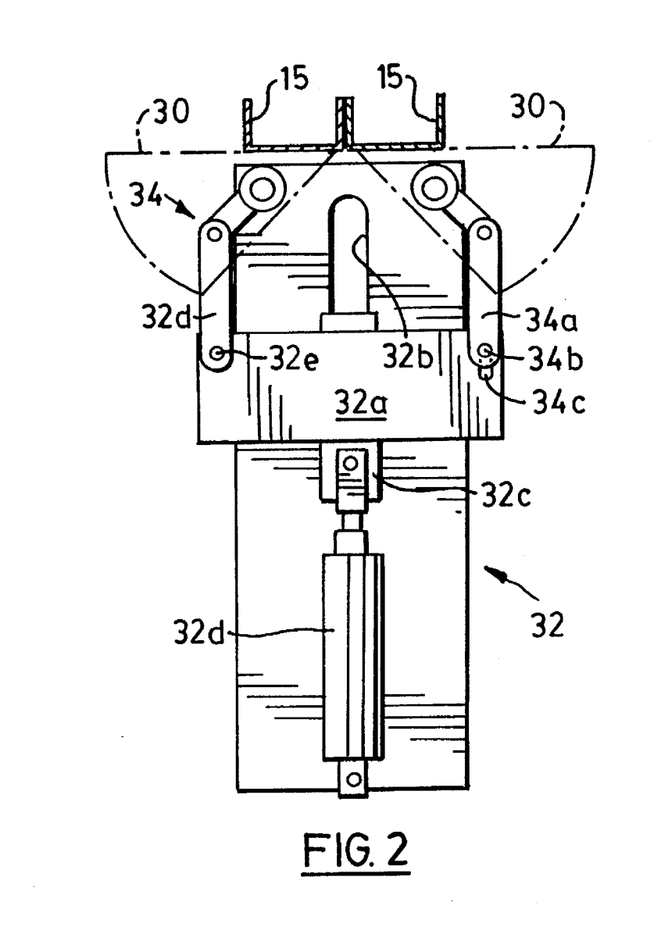
FIG. 2 is sectional view taken on line 2—2 of FIG. 1.

Referring to FIG. 2, the actuating mechanism 32 includes a pair of double link mechanisms shown generally at 34, each joined between a respective one of the shafts and an actuating plate 32a. One link is fixed to the shaft while the other link is pivoted to the actuating plate 32a. The actuating plate 32a is constrained to vertical travel along a vertical guide 32b by way of a sliding block 32c. The actuating plate 32a is driven by an actuator 32d mounted at its lower end to a portion of the main frame 12 and pivotally mounted at its upper end to the actuating plate 32a.

The actuating links 34 are arranged to enable one of the paddles 30 to be actuated in advance of the other inorder to nest said channel members with their formations in staggered relationship. To achieve this, the right hand link 34a is pivotally coupled to the actuating plate 32a by way of a pivot 34b which in turn extends through a vertically oriented slot 34c in the actuating plate 32a. The left hand link 32d, on the other hand, is pivotally coupled to the actuating plate 32a by way of a pivot 32e which in turn extends through a hole in the actuating plate 32a. In this manner, when the actuating plate 32a rises, the left hand link moves with it turing its associated paddle. The right hand link moves when the pin is at the lower end of the slot 32c. This causes the left hand paddle to rotate prior to the right hand paddle. If desired, the right hand paddle may be arranged to move in advance of the left hand paddle, simply by reversing the plate 32a. The selection of the set of paddles 30 to be advance depends on the orientation of the channel members 15 as they are fed onto the feed conveyor 14, as will be described.

Figure 6:
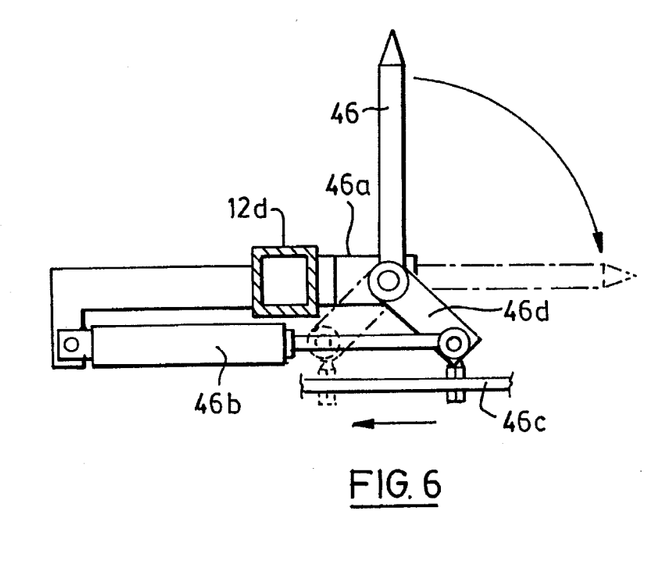
FIG. 6 is a fragmentary sectional view of another portion of the nesting device of FIG. 1.

Referring now to FIG. 5, the secondary bed 22 is located below the elongate aperture 20 and has an assembly surface 40. The secondary bed 22 has a receiving area 42 which receives successive pairs of nested channel members 15 from the elongate aperture 20 and an assembly area 44 wherein successive groups of nested channel members 15 are assembled. The receiving area 42 is bounded on one side by first transfer means in the form of a series of indexing pins 46 and on the other side by a series of indexing arms 48 (only one of each being shown for sake of brevity). Referring to FIGS. 5 and 6, each indexing pin 46 is mounted on a portion 12d of the main frame 12 by way of a bracket 46a and function as abutment means movable from a vertical transfer-inhibiting position to a horizontal position by an actuator 46b.

Each indexing pin 46 also includes a slave link 46c that is pivotally mounted to a slave arm 46d, allowing the actuator to pivot the series of indexing pins 46 at the same time.

Figure 7:
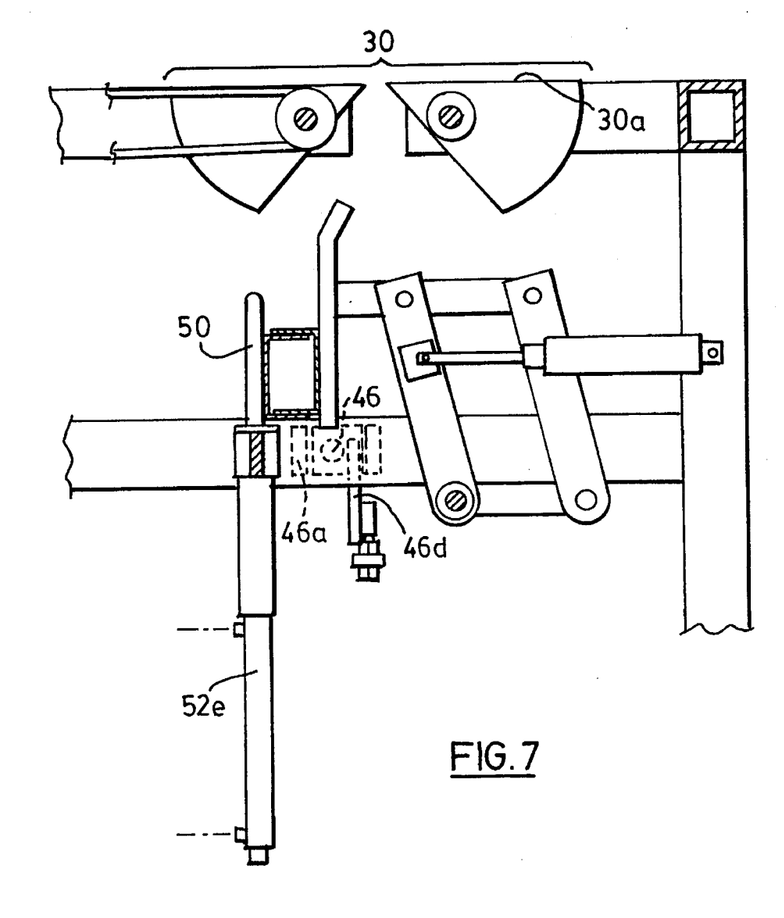
FIG. 7 is another fragmentary sectional view of another portion of the nesting device of FIG. 1.
Figure 8:
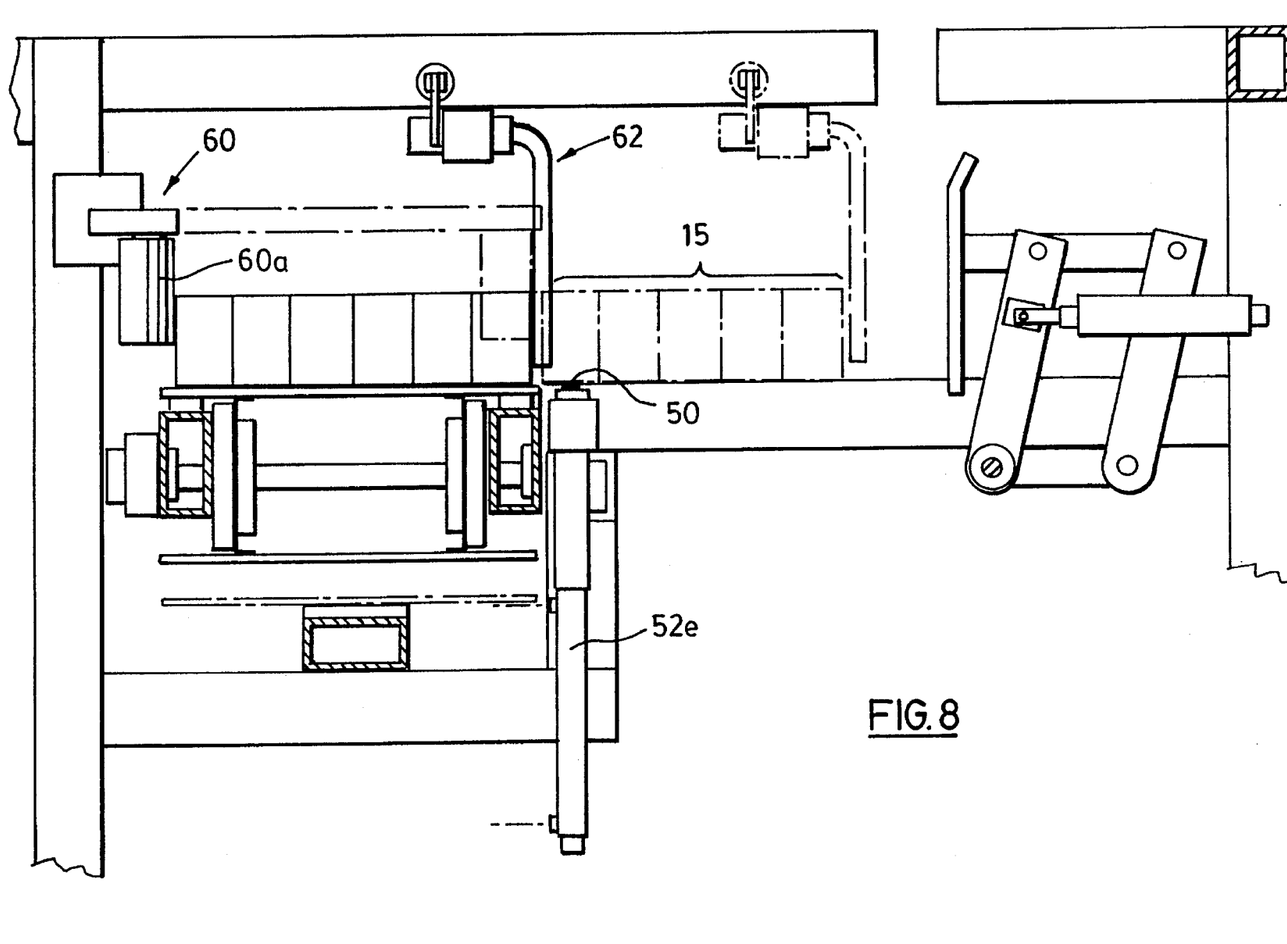
FIG. 8 is still another fragmentary sectional view of another portion of the nesting device of FIG. 1.
Figure 9:
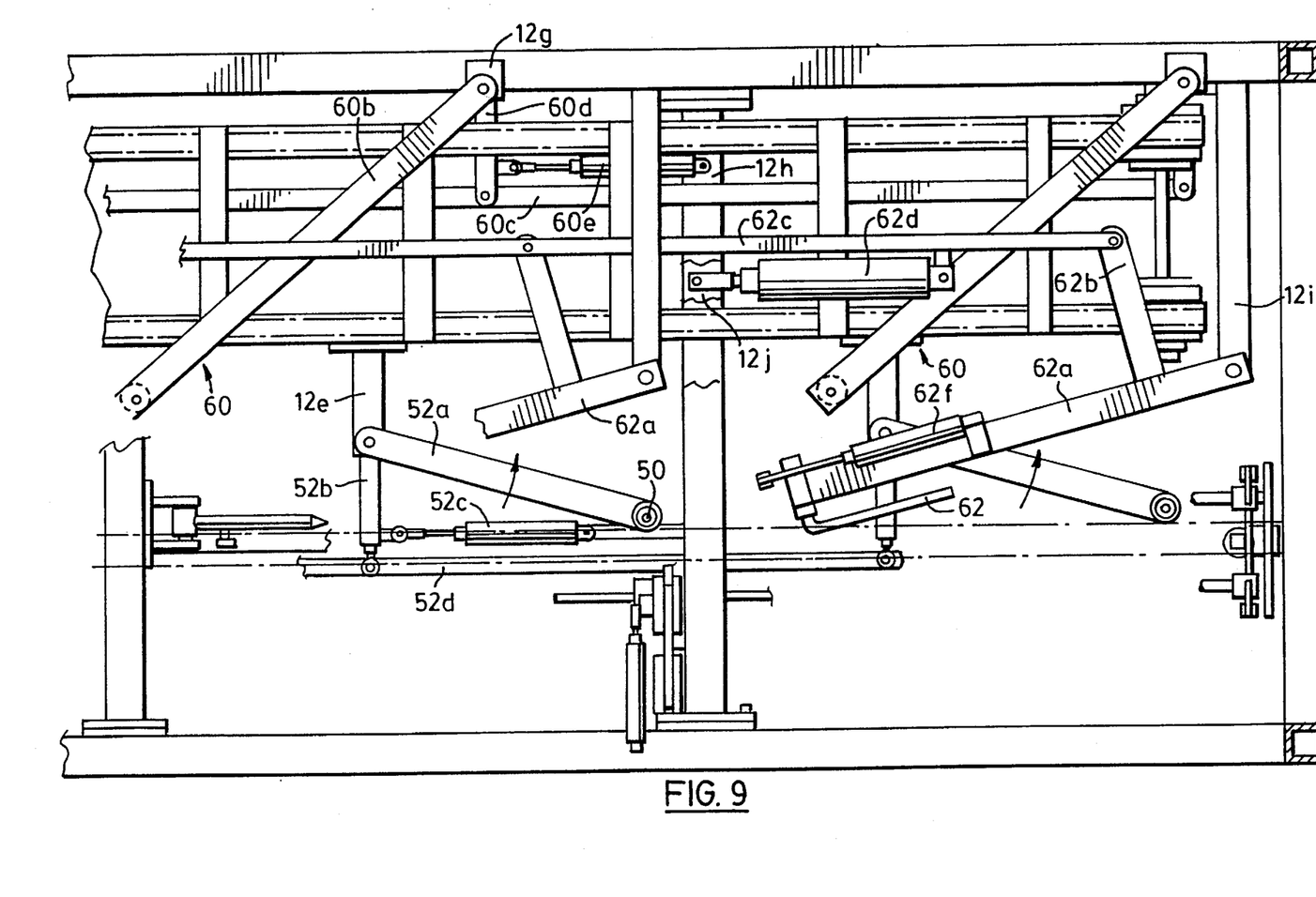
FIG. 9 is a fragmentary sectional view of still another portion of the nesting device of FIG. 1.

Referring to FIGS. 7, 8 and 9, a series of keeper pins 50 are also provided as first pressure means to maintain slight pressure on the nested channel members 15, as will be explained. The keeper pins 50 are each mounted on one arm 52a of a bell crank and pivotally mounted to a portion 12e of the main frame. The other arm 52b of the bell crank is joined to an actuator 52c to rotate the bell crank. A slave arm 52d is also joined to the other arm to join the other keeper pins 50 together for actuation by the actuator 52c. Each of the keeper pins 50 is vertically movable, by way of actuator 52e, from its operative position as shown in FIG. 7 to a release position below the plane of the assembly area as shown in FIG. 8. The keeper pins 50 are activated by a limit switch (not shown) which triggers the actuator 52e when the keeper pins 50 reach a predetermined position.

Referring to FIG. 5, the indexing arms 48 are each driven by a parallel link mechanism 48a to 48d, with the link 48b fixed to another portion 12f of the main frame. An actuator 48e operates the indexing arms from the retracted position shown in FIG. 5 to the extended position shown in FIG. 7 to transfer a pair of nested channel members from the receiving area 42 toward the assembly area 44. The indexing arms are also slaved to others not shown, by being fixed to shaft 48f.

Referring now to FIGS. 5, 8 and 9, there is provided two sets of transfer arms, one of a first set shown at 60 and one of a second set shown at 62. The first set is located ahead of, and the second set behind, an assembled group of nested channel members 15. The first set of transfer arms each include a rollable cylinder 60a which is arranged to engage the side of a group of nested channel members. Each cylinder is mounted on the remote end one arm 60b of a bell crank. A slave link 60c is pivotally connected to the other arm 60d of the bell crank. An actuator 60e is pivotally connected to the actuating link and is anchored to another portion 12h of the main frame 12. The first transfer arms function as second pressure means for maintaining pressure on the group of nested channel members from the receiving area to the assembly area.

Each of the second transfer arms 62 is pivotally coupled to the remote end a link 62a, the other end of which is pivoted to yet another portion 12i of the main frame. Another link 62b is fixed to the link 62a and is pivoted to a slave link 62c. An actuator 62d is pivoted between the slave link 62c and another portion 12j of the main frame 12. Each of the second transfer arms 62 is movable from a vertical operative position as shown in FIG. 8 to a horizontal position as shown in FIG. 9 by way of an actuator shown at 62f. The second transfer arms function as second transfer means for transferring the group of nested channel members from the assembly area to a delivery area as will be described.

The first and second transfer arms are arranged to move from their positions on opposite sides of the assembly area 44 of the secondary bed 22 toward positions on opposite sides of a loading area shown at 70. The loading area is provided with a takeaway conveyor 72 to remove the group of nested channel members.

In use, the channel members 15 are delivered individually by the feed conveyor 14 and are timed to be ejected by the pusher plate 16a onto the positioning conveyor. The positioning conveyor 18 delivers the channel members the elongate aperture 20. As the first channel member approaches the elongate aperture 20, it will engage the second proximity switches 25 and will thereafter engage the first proximity switches 24. A subsequent channel member will then engage the second proximity switch. In this manner, the occurrence of the first signal by the first proximity switch detects the presence of initial channel member while the second signal by the second proximity switch detects the presence of the subsequent channel member.

When two channel members 15 are present at the two proximity switches, the paddles 30 are actuated by actuator 32 to cause each of the channel members 15 to be nested together.

A particular feature of the paddles is that they have a semicircular lower surface which provides an abutment surface for incoming channel members while two previous channel members are being nested. This prevents the paddles from pinching the incoming channel members (or operators' protuberances for that matter) during the nesting step.

A particular feature of the nesting device 10 is that one of the paddles 30 may be triggered to advance before the other, allowing one of the channel members 15 to begin its nesting motion ahead of the other. This is useful when the channel members 15 have uneven side walls as shown by schematic flow diagram of FIG. 11. FIG. 11 shows a number of positions through the motion of the paddles 30. In each case, each channel member 15 has a nesting surface with a number of formations thereon in the form of a 'long' wall 15a which is higher than the adjacent 'short' wall 15b. The free ends of each wall has an inwardly pointing right-angled flange 15c. It may be desirable to nest these channel members 15 with the short wall of the right channel member 15 above the adjacent long side wall of the left channel member 15 as shown in position f). If the short wall is allowed to fit inside and below the flange of the corresponding long wall, there is a risk that the channel members 15 will become locked together, especially if the difference between the length of the short and long walls is about equal to the thickness of the flange on the long wall.

Depending on where the channel members are positioned on the paddles, the channel members may move along the top surface of the paddle to adjust to the position appropriate for the nesting function to occur. For example, the channel members may be too close to one another prior the nesting function, so that during the initial rotation of the paddles, the channels may move away from one another. This can be seen throughout the views of FIG. 11.

When the paddles 30 reach their vertical position, the now nested channel members 15 are deposited through the elongate aperture 20 and come to rest as shown in FIG. 5 between the keeper pins 50, the indexing pins 46 and the indexing arms 48. The indexing pins 46 are then pivoted to their horizontal position and the indexing arms 48 transfer the nested channel members 15 to the assembly area 44 against the slight resistance of the keeper pins 50. The indexing pins 46 are then returned to their upright ready position for another pair of nested channel members 15. The nested channel members 15 are thus held together by the keeper pins 50 on one side and the indexing pins 46 on the other.

The indexing arms 48 are then returned to their ready position beside the receiving area 42. Each time a pair of nested channel members 15 are assembled in the assembly area 44, the keeper pins 0 maintain pressure until the assembled pairs accumulate to the point that the leading face of the assembled pairs engages the first transfer arms 60. At this point, the first transfer arms 60 take over the retaining pressure from the keeper pins 50, the keeper pins 50 retract and the actuator 52c returns them to their initial position. However, the keeper pins do not extend again until later in the procedure. At this point, there are four assembled pairs between the first transfer arms and the indexing pins 46.

A fifth pair of nested channels are deposited into the receiving area between the indexing pins 46 and the indexing arms, 48. The indexing pins are then moved to their horizontal position, causing the first four assembled pairs to move backward to contact the fifth pair under the pressure of the first transfer arms 60. The indexing arms 48 then transfer all five assembled pairs back into the assembly area 44. The second transfer arms move to their vertical position to take over the task of maintaining pressure against the trailing face of the assembled five assembled pairs from the indexing arms 48 which thereafter return to their original position on the right hand side of the receiving area 42. Meanwhile, the indexing pins 46 and the keeper pins 50 are returned to their upright ready positions on the left hand side of the receiving area to receive the first pair of the next group of assembled pairs.

Figure 10:
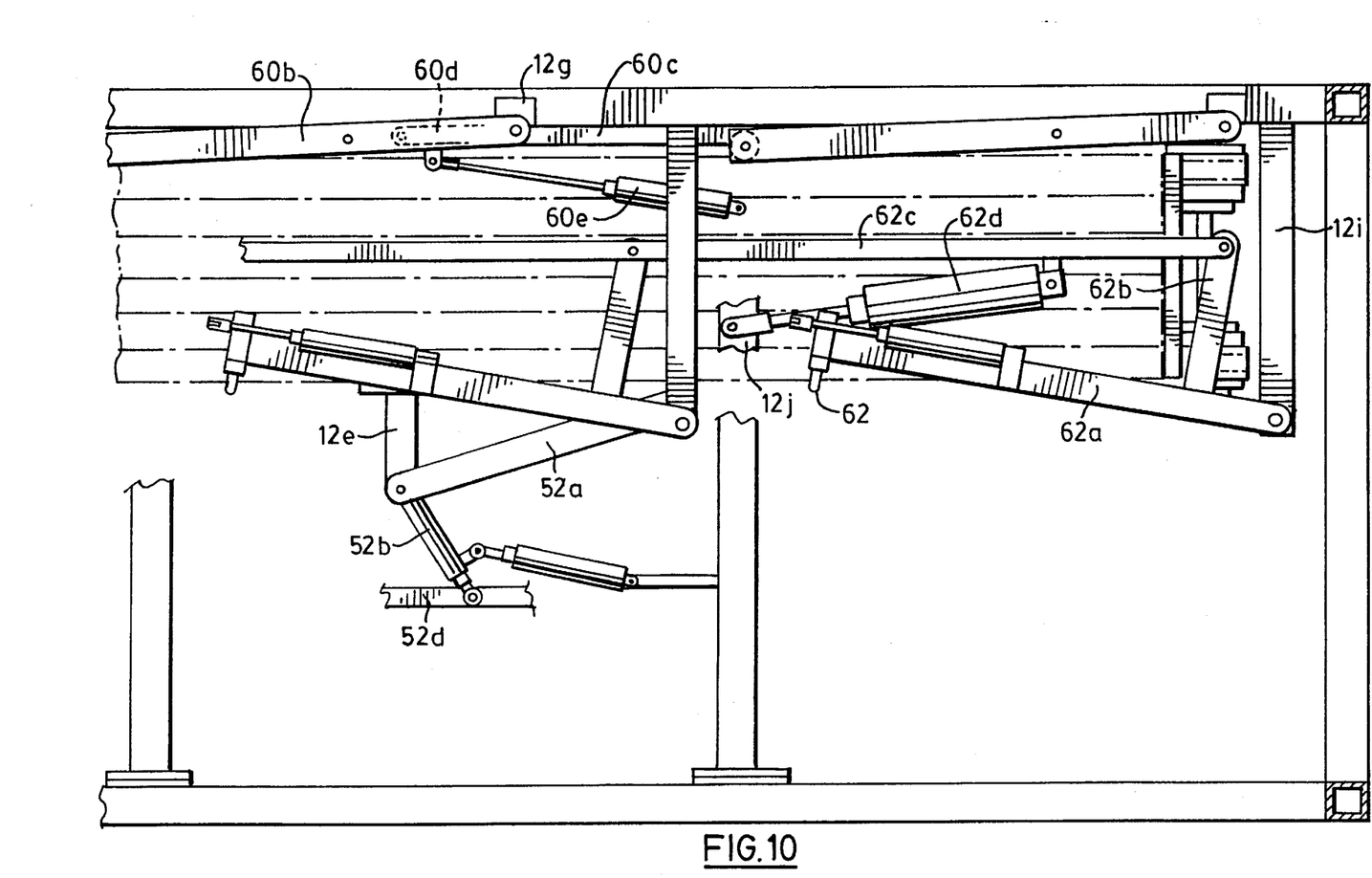
FIG. 10 is a fragmentary sectional view of the portion illustrated in FIG. 9 in another operative position.
Figure 11A:
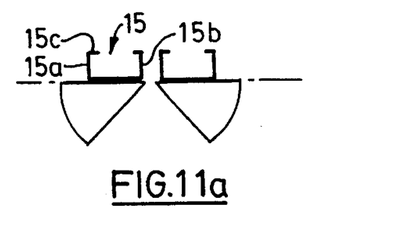
FIG. 11 is a schematic view of several operations of one portion of the nesting device illustrated in FIG. 1.
Figure 11B:
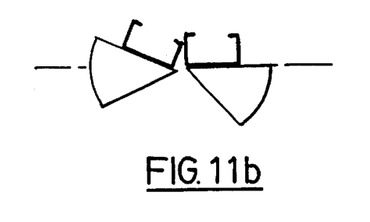
Figure 11C:
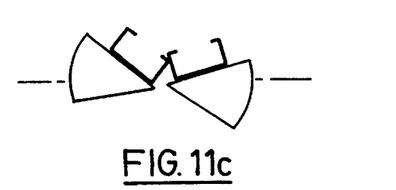
Figure 11D:
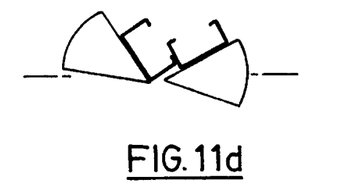
Figure 11E:
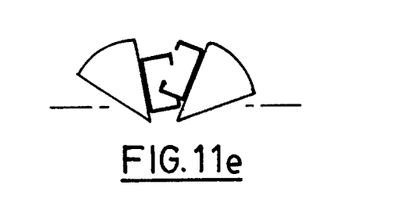
Figure 11F:
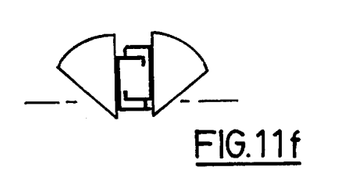

With the five assembled pairs now between the first and second transfer arms, the first and second transfer arms transfer the five assembled pairs to the delivery area 70 as shown in FIG. 10. The five assembled pairs are thereafter removed from the delivery area 70 by the takeaway conveyor 72 toward a banding station. Once the five assembled pairs are removed by the takeaway conveyor 72, the first and second transfer arms may be returned to their original positions, with the first transfer arm ready to exert pressure on the leading face of the next group of four assembled pairs and the second transfer arm in the horizontal position as shown in FIG. 9.

While the nesting device 10 has been shown to assemble five nested pairs, it will be understood that the device can also be used to assemble other numbers of nested pairs, such as for example three to six nested pairs, provided that the assembly and delivery areas have the space to accommodate the number of pairs being assembled. In addition, the transfer arms 60 may be arranged to take over the task of maintaining pressure on the leading face of leading one of the group of assembled pairs at a different stage in the process, for example after the second, third or fourth nested pair has been transferred to the assembly area.

While the above embodiment makes use of a conveyor to transfer the channel members along the main bed, the main bed may instead be inclined so that this movement can occur by the force of gravity, as shown by the dashed lines at 12g in FIG. 5.

Figure 12:
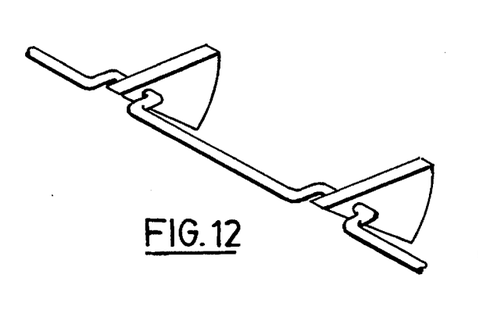
FIG. 12 is a perspective view of a portion of a another nesting device.
Figure 13:
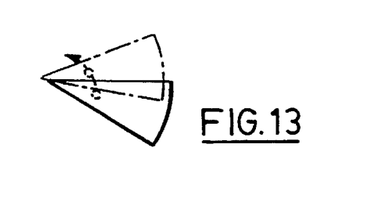
FIG. 13 is a schematic view of the operation of the portion illustrated in FIG. 12.
Figure 14A:
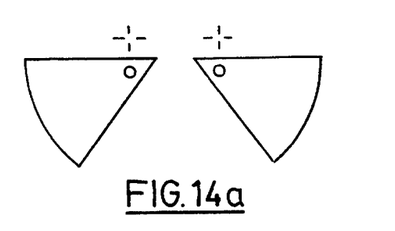
FIGS. 14a, b and c are schematic views similar to FIG. 13 of yet another nesting device.
Figure 14B:
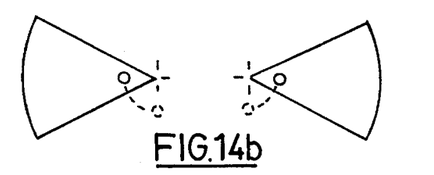
Figure 14C:
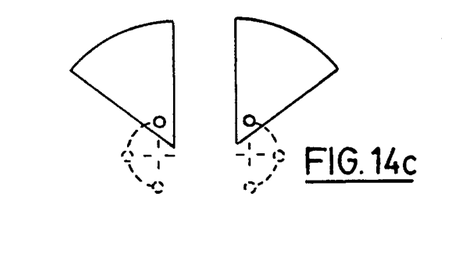

In addition, the paddles may be provided with a second degree of motion during the activation of the paddles as shown in FIGS. 12, 13 and 14. In this case, the paddles are mounted on a cam shaft arrangement wherein the rotational axis of the paddles is shifted horizontally, which will cause the opposing paddles to swing upward and later toward one another as the cam reaches its top dead center.

If the cam shifts the axis of rotation vertically, the rotation of the shaft will swing the paddles away from one another, then upward through 90 degrees of rotation and then back toward one another as the shaft approaches 180 degrees of rotation. This may be particularly useful for square channel members which can be moved away from their side-by-side position so that they can be nested together.

While the nesting device is useful for nesting channel members, there may be other equally useful applications to nest other articles, such as those that have a nesting surface with a number of formations thereon, including differently shaped or sized end walls, or extremities that have been treated in some fashion requiring one of the articles to be advanced ahead of the other.

In addition, there may be portions of the device 10 that may be used in other applications. For example, the portion of the device 10 below the main bed may be used to assemble groups of articles such as extrusions and the like downstream of an earlier station in the forming process, wherein the articles may be transferred from a receiving area to an assembly area with the use of a transfer means on the trailing face and a means for maintaining pressure on the leading face, and from the assembly area to a delivery area in a similar manner.

I claim:

1. A device for nesting articles, each of said articles having nesting formations on one side thereof, comprising:

a pair of opposed locating means, each having an article-receiving surface to receive a respective one of a pair of articles to be nested; each of said locating means being movable from an article-receiving position to a generally upright article-nesting position;

actuating means for actuating said locating means toward said article-nesting position, said actuating means being further arranged to actuate one of said locating means in advance of the other thereby to nest the formations of one of said articles with the formations on the other of said articles to form a nested pair; and a discharge passage provided between said locating means in said article-nesting position, each of said article-receiving surfaces being arranged to discharge said nested pair through said discharge passage; and receiving means located beneath said passage to receive said nested pair.

2. A device as defined in claim 1, further comprising a main bed; said discharge passage being provided by an aperture formed in said main bed, said pair of opposed locating means being respectively located on opposite sides of said aperture, said aperture being obstructed by said first and second locating means in said article-receiving position and being open to form said passage when said locating means are in said article-nesting position.

3. A device as defined in claim 2 further comprising supply means located adjacent a first of said locating means to supply said articles thereto.

4. A device as defined in claim 3 further comprising abutment means located adjacent a second of said locating means and opposed to said supply means and is arranged to abut one of said pair of articles thereby to align said articles on said locating means.

5. A device as defined in claim 4 wherein said abutment means is stationary relative to said locating means, wherein said articles include longitudinal side walls forming said formations and said articles align with one another along respective longitudinal side walls.

6. A device as defined in claim 2 further comprising a secondary bed to receive nested pairs of said articles, said secondary bed including a receiving area beneath said aperture.

7. A device as defined in claim 6 wherein said secondary bed further includes an assembly area, said device further comprising indexing means for transferring said nested pairs from said receiving area to said assembly area.

8. A device as defined in claim 7 wherein said indexing means includes a series of indexing arms movable from one position adjacent said receiving area to a position adjacent said assembly area.

9. A device as defined in claim 8 wherein said indexing means includes a series of indexing pins positioned adjacent said receiving area opposite said indexing arms, said indexing pins operable from a position to form a barrier between said receiving and assembly areas and an inoperable position wherein said nested pairs may be transferred between said receiving and assembly areas.

10. A device as defined in claim 7 wherein said device further includes retaining means to retain said nested pairs in said assembly area.

11. A device as defined in claim 10 wherein said assembly area is dimensioned to receive a number of assembled pairs of nested articles.

12. A device as defined in claim 10 wherein a first of said nested pairs has a leading face, said retaining means includes at least one keeper pin movable between said receiving and assembly areas to maintain pressure on said leading face.

13. A device as defined in claim 10 wherein said secondary bed includes a delivery area, further comprising first and second transfer means for transferring said assembled pairs from said assembly area to said delivery area.

14. A technique for nesting articles, each of said articles having nesting formations on one side thereof, said technique including the steps of:

providing a pair of opposed locating elements, each being movable from an article-receiving position to a generally upright article-nesting position and each with an article-receiving surface to receive a respective one of a pair of articles to be nested;

actuating each of said locating elements toward said article-nesting position, wherein one of said locators is actuated in advance of the other, thereby to nest the formations of one of said articles with the formations on the other of said articles to form a nested pair; and providing a discharge passage between said locators in said article-nesting position;

arranging said locating elements to discharge said nested pair through said discharge passage; and receiving said nested pair beneath said discharge passage.

15. A device for nesting articles of the type having a nesting surface with a number of formations thereon, comprising;

first locating means for locating a first article and second locating means for locating a second article, actuating means for actuating said first and second locating means to cause said articles to nest together at said nesting surfaces, said actuating means including a first mechanism to actuate said first locating means and a second mechanism to actuate said second locating means, said first mechanism being arranged to actuate in advance of said second mechanism, in order to nest said articles with said formations in staggered relationship;

a main bed; an aperture formed in said main bed, said first and second locating means being located on opposite sides of said aperture wherein said each of first and second locating means includes first and second sets of paddles, each of said sets being arranged for simultaneous rotation about a respective common axis.

16. A device as defined in claim 15 wherein said first and second sets of paddles are secured on a respective pair of shafts, each of said first and second mechanisms including a linkage for rotating a respective one of said shafts.

17. A device as defined in claim 16 wherein said actuating means includes an actuating plate, said actuating plate joined to each of said linkages, a first of said linkages arranged to rotate the shaft of said first set of paddles in advance of the shaft of said second set.

* * * * *